United States Patent
Sobanski et al.

(10) Patent No.: US 11,092,022 B2
(45) Date of Patent: Aug. 17, 2021

(54) VANE WITH CHEVRON FACE

(71) Applicant: United Technologies Corporation, Farmington, CT (US)

(72) Inventors: Jon E. Sobanski, Glastonbury, CT (US); Bryan P. Dube, Columbia, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 107 days.

(21) Appl. No.: 16/672,611

(22) Filed: Nov. 4, 2019

(65) Prior Publication Data

US 2021/0131296 A1    May 6, 2021

(51) Int. Cl.
*F01D 9/04* (2006.01)
*F01D 17/16* (2006.01)

(52) U.S. Cl.
CPC ........... *F01D 9/041* (2013.01); *F01D 17/162* (2013.01); *F05D 2220/323* (2013.01); *F05D 2240/12* (2013.01); *F05D 2240/80* (2013.01); *F05D 2250/712* (2013.01); *F05D 2250/75* (2013.01);
(Continued)

(58) Field of Classification Search
CPC .. F01D 9/041; F01D 17/162; F05D 2250/712; F05D 2300/6033; F05D 2240/12; F05D 2220/323; F05D 2250/75; F05D 2300/2261; F05D 2240/80
See application file for complete search history.

(56) References Cited

U.S. PATENT DOCUMENTS

| 3,302,926 | A | * | 2/1967 | Bobo | ...................... F01D 9/042 415/209.2 |
| 4,015,910 | A | * | 4/1977 | Harmon | .................. F01D 9/042 415/209.4 |

(Continued)

FOREIGN PATENT DOCUMENTS

| EP | 1808577 | | 7/2007 | |
| EP | 3770380 | | 1/2021 | |
| JP | 2012246919 | A * | 12/2012 | ............ F01D 11/008 |

OTHER PUBLICATIONS

European Search Report for European Patent Application No. 20203334.6 completed Feb. 15, 2021.

*Primary Examiner* — Woody A Lee, Jr.
*Assistant Examiner* — Brian Christopher Delrue
(74) *Attorney, Agent, or Firm* — Carlson, Gaskey & Olds, P.C.

(57) ABSTRACT

A gas turbine engine component includes a vane arc segment that defines an axis. The vane arc segment includes an airfoil section and first and second platforms. The airfoil section has a first radial end, a second radial end, a first side, a second side, a leading edge, and a trailing edge. The airfoil section has associated characteristics, including a center of pressure and an aerodynamic load vector through the center of pressure. The first platform defines a first side chevron face that has a leading leg and a trailing leg that meet at an angle. The leading leg is elongated along a centerline that is non-axially oriented with respect to the axis, the leading leg meets the leading face at a leading first side corner. The leading first side corner is located outside of the aerodynamic load vector relative to the leading edge of the airfoil section.

20 Claims, 4 Drawing Sheets

(52) U.S. Cl.
CPC .............. *F05D 2300/2261* (2013.01); *F05D 2300/6033* (2013.01)

(56) References Cited

U.S. PATENT DOCUMENTS

| | | | | |
|---|---|---|---|---|
| 4,639,189 | A * | 1/1987 | Rosman | F01D 9/041 415/115 |
| 4,802,823 | A * | 2/1989 | Decko | F01D 5/147 416/97 A |
| 6,050,776 | A * | 4/2000 | Akagi | F01D 5/22 415/138 |
| 6,261,058 | B1 * | 7/2001 | Kataoka | F01D 5/288 415/189 |
| 7,229,245 | B2 * | 6/2007 | Ellis | F01D 9/041 415/135 |
| 7,293,957 | B2 * | 11/2007 | Ellis | F01D 9/041 415/135 |
| 7,862,291 | B2 * | 1/2011 | Surace | F01D 9/041 415/115 |
| 8,047,771 | B2 * | 11/2011 | Tucker | B23K 1/0018 415/137 |
| 8,096,757 | B2 * | 1/2012 | Snook | F01D 9/02 415/191 |
| 8,157,515 | B2 * | 4/2012 | Bailey | F01D 9/041 415/202 |
| 8,449,249 | B2 * | 5/2013 | Suchezky | F01D 9/044 415/139 |
| 8,961,135 | B2 * | 2/2015 | Beeck | F01D 5/22 416/97 R |
| 8,967,961 | B2 * | 3/2015 | McCaffrey | F01D 5/284 415/200 |
| 8,967,973 | B2 * | 3/2015 | Ingram | F01D 5/143 416/191 |
| 9,506,362 | B2 * | 11/2016 | Burdgick | F01D 9/042 |
| 9,915,154 | B2 * | 3/2018 | Berczik | F01D 25/246 |
| 10,072,516 | B2 * | 9/2018 | Carr | F01D 25/28 |
| 10,724,404 | B2 * | 7/2020 | Takamura | F01D 25/243 |
| 10,975,709 | B1 * | 4/2021 | Woodfield | F01D 9/042 |
| 2001/0019695 | A1 * | 9/2001 | Correia | F01D 9/04 415/135 |
| 2007/0166154 | A1 * | 7/2007 | Ellis | F01D 9/041 415/211.2 |
| 2009/0274562 | A1 * | 11/2009 | Minor | F01D 5/288 416/241 R |
| 2010/0028143 | A1 * | 2/2010 | Bailey | F01D 11/005 415/202 |
| 2012/0301315 | A1 * | 11/2012 | Alvanos | F01D 9/041 416/230 |
| 2013/0011265 | A1 * | 1/2013 | Miller | F01D 9/041 416/191 |
| 2013/0052030 | A1 * | 2/2013 | McCaffrey | C04B 35/80 416/241 B |
| 2014/0000286 | A1 * | 1/2014 | Spangler | F01D 9/041 60/806 |
| 2016/0177766 | A1 * | 6/2016 | Rioux | F01D 11/008 416/244 R |
| 2021/0102469 | A1 * | 4/2021 | Sobanski | F01D 9/04 |

* cited by examiner

VANE WITH CHEVRON FACE

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The compressor section can include rotors that carry airfoils to compress the air entering the compressor section. A shaft may be coupled to the rotors to rotate the airfoils.

SUMMARY

A gas turbine engine according to an example of the present disclosure includes a vane arc segment that defines an axis. The vane arc segment has an airfoil section that has a first radial end, a second radial end, a first side, a second side, a leading edge, and a trailing edge. The airfoil section has associated characteristics including a center of pressure and an aerodynamic load vector through the center of pressure. A first platform and a second platform are arranged, respectively, at the first radial end and the second radial end of the airfoil section. The first platform defines a leading face, a trailing face, a first side chevron face, and a second side face. The first side chevron face has a leading leg and a trailing leg that meet at an angle. The leading leg is elongated along a centerline that is non-axially oriented with respect to the axis. The leading leg meets the leading face at a leading first side corner, and the leading first side corner is located outside of the aerodynamic load vector relative to the leading edge of the airfoil section.

In a further embodiment of any of the foregoing embodiments, the leading leg defines a plane that is non-intersecting with the aerodynamic load vector forward of the center of pressure.

In a further embodiment of any of the foregoing embodiments, the centerline is substantially parallel with the aerodynamic load vector.

In a further embodiment of any of the foregoing embodiments, the leading leg defines a plane that is non-intersecting with the aerodynamic load vector forward of the center of pressure.

In a further embodiment of any of the foregoing embodiments, the airfoil section, the first platform, and the second platform form a continuous piece, and the continuous piece is formed of a ceramic matrix composite.

In a further embodiment of any of the foregoing embodiments, the ceramic matrix composite includes silicon carbide fibers disposed in a silicon carbide matrix.

In a further embodiment of any of the foregoing embodiments, the first platform is a radially inner platform, the first side chevron face is a pressure side chevron face, and the second side face is a suction side face.

A gas turbine engine component according to an example of the present disclosure includes a vane arc segment that defines an axis. The vane arc segment has an airfoil section that has a first radial end, a second radial end, a pressure side, a suction side, a leading edge, and a trailing edge. The airfoil section has associated characteristics including a center of pressure and an aerodynamic load vector through the center of pressure. A first platform and a second platform are arranged, respectively, at the first radial end and the second radial end of the airfoil section. The first platform defines a leading face, a trailing face, a pressure side chevron face, and a suction side face. The pressure side chevron face has a leading leg and a trailing leg that meet at an angle. The leading leg defines a plane that is non-intersecting with the aerodynamic load vector forward of the center of pressure. The leading leg meets the leading face at a leading pressure side corner, and the leading pressure side corner is located outside of the aerodynamic load vector relative to the leading edge of the airfoil section.

In a further embodiment of any of the foregoing embodiments, the leading leg is elongated along a centerline, and the centerline is substantially parallel with the aerodynamic load vector.

In a further embodiment of any of the foregoing embodiments, the airfoil section, the first platform, and the second platform form a continuous piece, and the continuous piece is formed of a ceramic matrix composite.

In a further embodiment of any of the foregoing embodiments, the ceramic matrix composite includes silicon carbide fibers disposed in a silicon carbide matrix.

In a further embodiment of any of the foregoing embodiments, the first platform is a radially inner platform.

A gas turbine engine component according to an example of the present disclosure includes a vane arc segment that defines an axis. The vane arc segment has an airfoil section having a first radial end, a second radial end, a pressure side, a suction side, a leading edge, and a trailing edge. The airfoil section has associated characteristics including a center of pressure and an aerodynamic load vector through the center of pressure, a first platform and a second platform are arranged, respectively, at the first radial end and the second radial end of the airfoil section. The first platform defines a leading face, a trailing face, a pressure side chevron face, and a suction side face. The pressure side chevron face has a leading leg and a trailing leg that meet at an angle. The leading leg is elongated along a centerline, and the centerline is substantially parallel with the aerodynamic load vector.

In a further embodiment of any of the foregoing embodiments, the centerline is non-axially oriented with respect to the axis.

In a further embodiment of any of the foregoing embodiments, the leading leg defines a plane that is non-intersecting with the aerodynamic load vector forward of the center of pressure.

In a further embodiment of any of the foregoing embodiments, wherein the leading leg meets the leading face at a leading pressure side corner, and the leading pressure side corner is located outside of the aerodynamic load vector relative to the leading edge of the airfoil section.

In a further embodiment of any of the foregoing embodiments, the leading leg defines a plane that is non-intersecting with the aerodynamic load vector forward of the center of pressure.

In a further embodiment of any of the foregoing embodiments, the airfoil section, the first platform, and the second platform form a continuous piece, and the continuous piece is formed of a ceramic matrix composite.

In a further embodiment of any of the foregoing embodiments, the ceramic matrix composite includes silicon carbide fibers disposed in a silicon carbide matrix.

In a further embodiment of any of the foregoing embodiments, the first platform is a radially inner platform.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
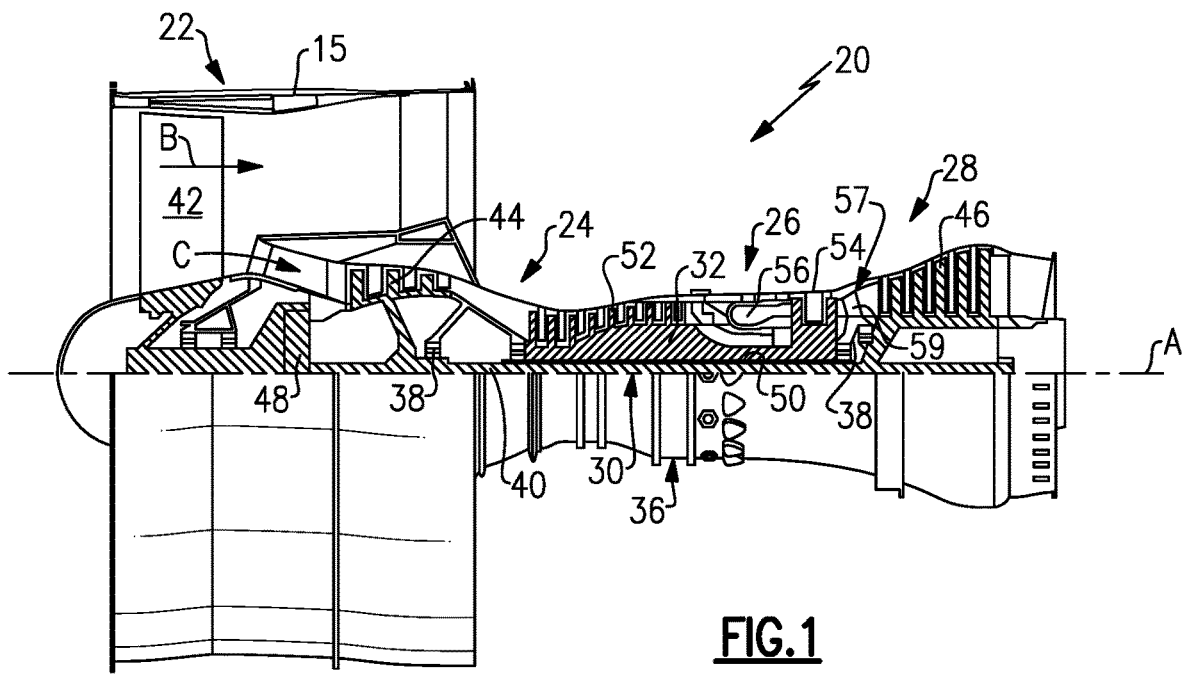
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. Terms such as "axial," "radial," "circumferential," and variations of these terms are made with reference to the engine central axis A. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7°R)]^0.5. The "Low corrected fan tip speed" as disclosed herein according to one non-limiting embodiment is less than about 1150 ft/second (350.5 meters/second).

Figure 2A:
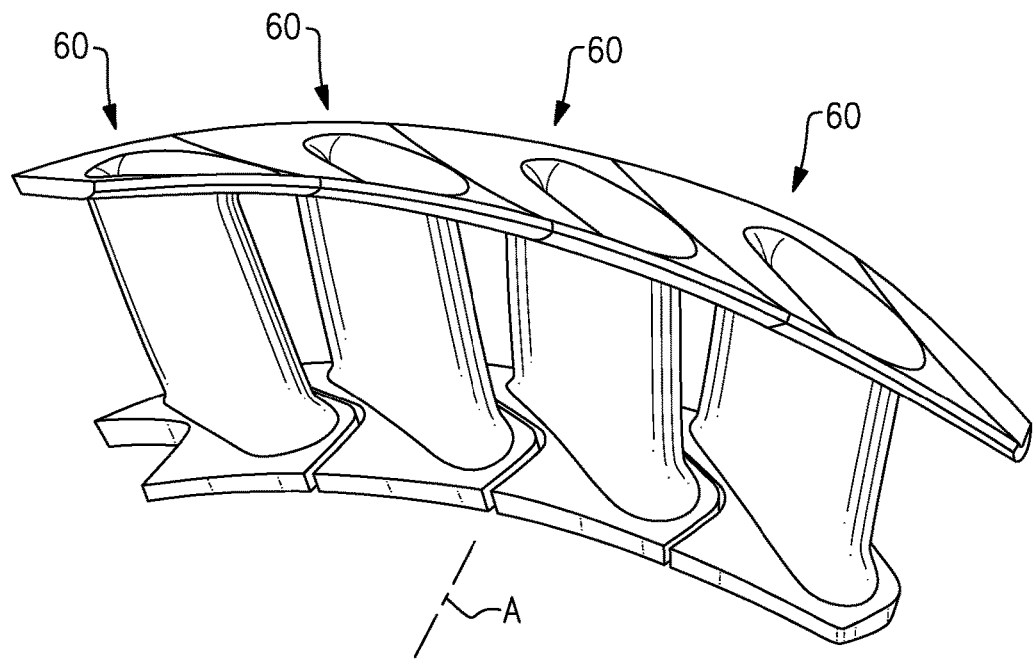
FIG. 2A illustrates a portion of a vane ring assembly that has a plurality of vane arc segments.
Figure 2B:
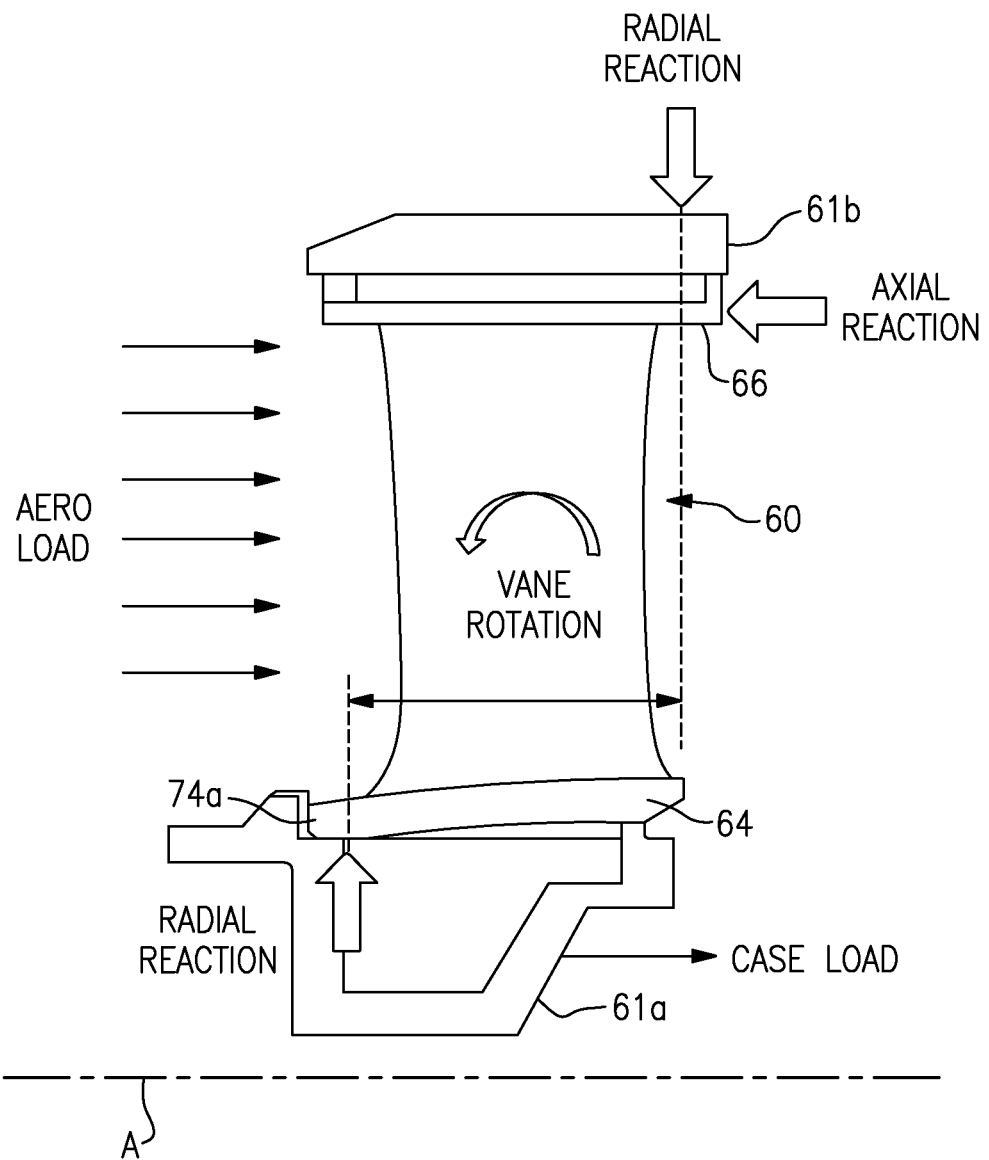
FIG. 2B illustrates a vane arc segments supported between inner and outer support structures.
Figure 3:
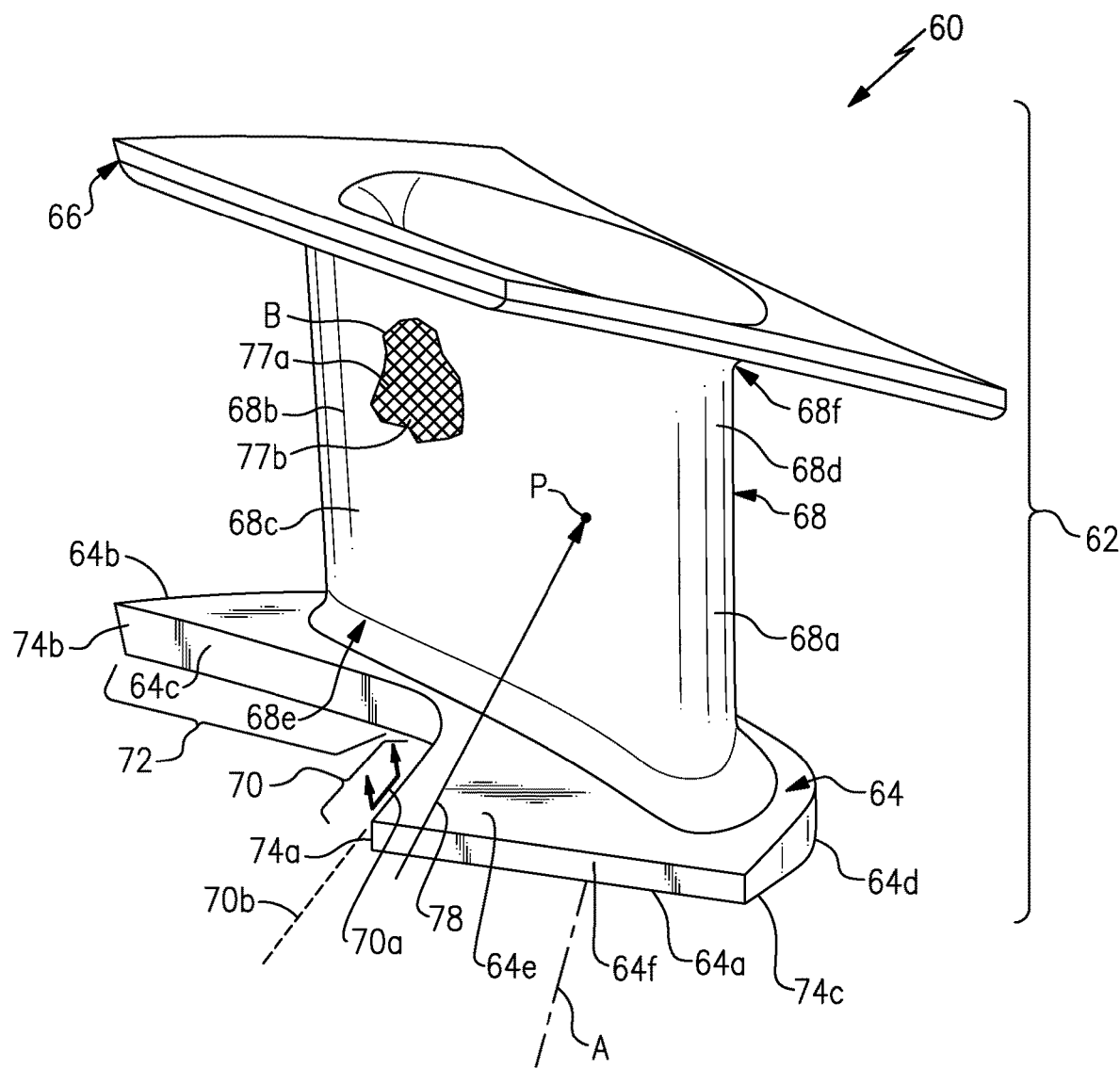
FIG. 3 illustrates an isolated view of a representative one of the vane arc segments.

FIG. 2A illustrates a representative portion of a vane ring assembly from the turbine section 28 of the engine 20. The vane ring assembly is made up of a plurality of vane arc segments 60 that are situated in a circumferential row about the engine central axis A. As shown in FIG. 2B, the vane arc segments 60 are supported between inner and outer support structures 61a/6 1b. FIG. 3 illustrates an isolated view of a representative one of the vane arc segments 60. Although the vane arc segments 60 are shown and described with reference to application in the turbine section 28, it is to be understood that the examples herein are also applicable to structural vanes in other sections of the engine 20. Additionally, the example vane arc segment 60 is a "singlet" that has a single airfoil between the inner and outer platforms. However, it is to be understood that the examples can also be applied to vane "doublets" that have two airfoils between inner and outer platforms, or vane "triplets" that have three airfoils between the inner and outer platforms. Thus, "a" and "an" used with regard to airfoils or airfoil sections of the vane arc segment 60 do not preclude more than one.

The vane arc segment 60 is comprised of an airfoil piece 62. The airfoil piece 62 includes several sections, including first and second platforms 64/66 and an airfoil section 68 that extends between the first and second platforms 64/66. The airfoil section 68 defines a leading edge 68a, a trailing edge 68b, first and second sides 68c/68d, and first and second radial ends 68e/68f. The first and second platforms 64/66 are arranged, respectively, at the first and second radial ends 68e/68f. In this example, the first platform 64 is a radially inner platform, the second platform 66 is a radially outer platform, the first side 68c is a pressure side, and the second side 68d is a suction side.

The first platform 64 defines a leading face 64a, a trailing face 64b, a first or pressure side chevron face 64c, a second or suction side face 64d, a gas path surface 64e, and a non-gas path surface 64f. The pressure side chevron face 64c and the suction side face 64d are mate faces that are situated adjacent, respectively, the suction side face 64d and the pressure side chevron face 64c of the adjacent vane arc segments 60 in the vane ring assembly. The pressure side chevron face 64c is comprised of a leading leg 70 and a trailing leg 72. The legs 70/72 are face sections of the pressure side chevron face 64c that meet at an angle to generally form the V-shape of the chevron.

The leading leg 72 meets the leading face 64a at a leading pressure side corner 74a. Likewise, the first platform 64 has a trailing pressure side corner 74b where the trailing leg 72 meets the trailing face 64b and a leading suction side corner 76c where the leading face 64a meets the suction side face 64d. The remaining corner of the first platform 64 is obscured from view in FIG. 3, but is a trailing suction side corner where the trailing face 64b meets the suction side face 64d.

Most typically, as shown, the V-shape of the pressure side chevron face 64c is pronounced in that the faces of the legs 70/72 are substantially planar and also substantially straight in their respective elongated directions up to the corner of the V-shape, which here is a radiused corner. It is to be understood, however, that the V-shape may alternatively be less pronounced, wherein greater extents of the faces of the legs 70/72 are radiused or even substantially radiused. For example, in a marginally pronounced chevron the faces of the legs 70/72 may be substantially radiused such that the pressure side chevron face 64c forms a continuous curve from corner 74a to corner 74b.

The leading leg 70 further defines a plane 70a and a centerline 70b along its elongated direction. For a straight leading leg 70, the plane 70a is that which the straight, planar face of the leading leg 70 lies in. The centerline 70b lies in the plane 70a of the face of the leading leg 70, midway between the gas path surface 64e and the non-gas path surface 64f. For a less pronounced chevron, the plane 70a is defined by the straight, planar portion of the leading leg 70, and the centerline 70b lies in the plane 70a of the straight portion of the face of the leading leg 70, midway between the gas path surface 64e and the non-gas path surface 64f. For a marginally pronounced chevron without or substantially without a straight portion, the plane 70a is that which includes the corner 74a and the deepest point in the corner of the chevron. The centerline 70a is the line that intersects the corner 74a and the deepest point in the corner of chevron, midway between the gas path surface 64e and the non-gas path surface 64f.

The vane arc segments 60 may be mounted in the engine 20 between inner and outer support structures. The support structures are not particularly limited and may be cases, intermediate carriers, or the like, and are typically formed of metallic alloys that can bear the loads received. During operation of the engine 20 combustion gases flow across the airfoil section 68 and gaspath surfaces of the platforms 64/66. The flow causes aerodynamic loads on the vane arc segment 60. The aerodynamic loads are transmitted through the vane arc segment 60 to the support structures.

The airfoil section 68 has additional characteristics related to its aerodynamics and resultant aerodynamic loads. The aerodynamic loads may be summed as a bulk, or total, aerodynamic load vector. For instance, the aerodynamic load vector may be optimized or designed for a maximum pressure condition and may be understood as the force applied at the center of pressure on the vane arc segment 60. As shown in FIG. 3, the total aerodynamic load vector ("ALV") is represented at 78. The ALV may also be known as the aerodynamic vector at the center of pressure. Alternatively, the ALV 78 in the illustrated example may also be represented by an angle that the ALV forms with the engine longitudinal axis A. For instance, the ALV 78 is coaxial with a line that forms an oblique angle with the axis A and which in a fore-to-aft direction intersects the pressure side 68c before the suction side 68d. It is to be appreciated that the lines and angles in the figures are shown schematically and are not necessarily shown as true orientations and angles.

The airfoil piece 62 is continuous in that the platforms 64/66 and airfoil section 68 constitute a single, uninterrupted body. As an example, the airfoil piece 62 may be formed of a ceramic material, such as a ceramic matrix composite. In the illustrated example, referring to cutaway section B in FIG. 3, the airfoil piece 62 is formed of a ceramic matrix composite in which ceramic fibers 77a are disposed in a ceramic matrix 77b. The ceramic matrix composite may be, but is not limited to, a SiC/SiC ceramic matrix composite in which SiC fibers are disposed within a SiC matrix. The ceramic fibers 77a may be provided in fiber plies. The plies may be woven or unidirectional and may collectively include plies of different fiber weave configurations. The fiber plies may be continuous through the first platform 64, the airfoil section 68, and the second platform 66. In one example, the fiber plies are laid-up in a laminate configuration. The examples herein are primarily directed to ceramic airfoil pieces 62, however, it is to be appreciated that this disclosure may also be applicable to certain stress-limited metallic alloys, such as refractory metallic alloys (e.g., molybdenum-based alloys) or other alloys that have high temperature resistance but low strength.

In general, support schemes for mounting structural vane segments formed of ceramic matrix composites or stress-limited metallic alloys are challenging due to lower material stress limits in comparison to high strength superalloys used for some traditional vane segments. Furthermore, it is difficult to find a mounting configuration that benefits pressure driven stresses without debiting thermally driven stresses or vice-versa, while also satisfying manufacturability and stress requirements. Therefore, even though ceramic matrix composites or stress-limited metallic alloys may have many potential benefits, such benefits cannot be realized without managing these concerns. In this regard, the vane arc segment 60 includes features that are discussed below to facilitate mitigation of these concerns.

In general, such features relate to the orientation of the leading leg 70 relative to the ALV 78. For example, the leading leg 70 has at least two out of the following three aspects: A) the centerline 70b is non-axially oriented with respect to the engine longitudinal axis A, B) the leading pressure side corner 74a is located outside of the ALV 78 relative to the leading edge 68a of the airfoil section 68, and C) the plane 70a is non-intersecting with the ALV 78 forward of the center of pressure P. For example, "outside" versus "inside" is determined by the region bound by the ALV 78, the center of pressure P, and the leading edge 68a, extended infinitely in the radial direction. If the leading pressure side corner 74a lies within that region, it is "inside" the ALV 78, and if the leading pressure side corner 74a is not in that region, it is "outside" the ALV 78.

In another example D), the centerline 70b is substantially parallel with the ALV 78. In a further example, the centerline 70b is parallel with the ALV 78 within a margin of +/−5°. In additional examples, the centerline 70b is substantially parallel with the ALV 78 or is parallel with the ALV 78 within a margin of +/−5°, and the leading leg 70 also has at least one out of the three aspects above A), B), and/or C).

Figure 4:
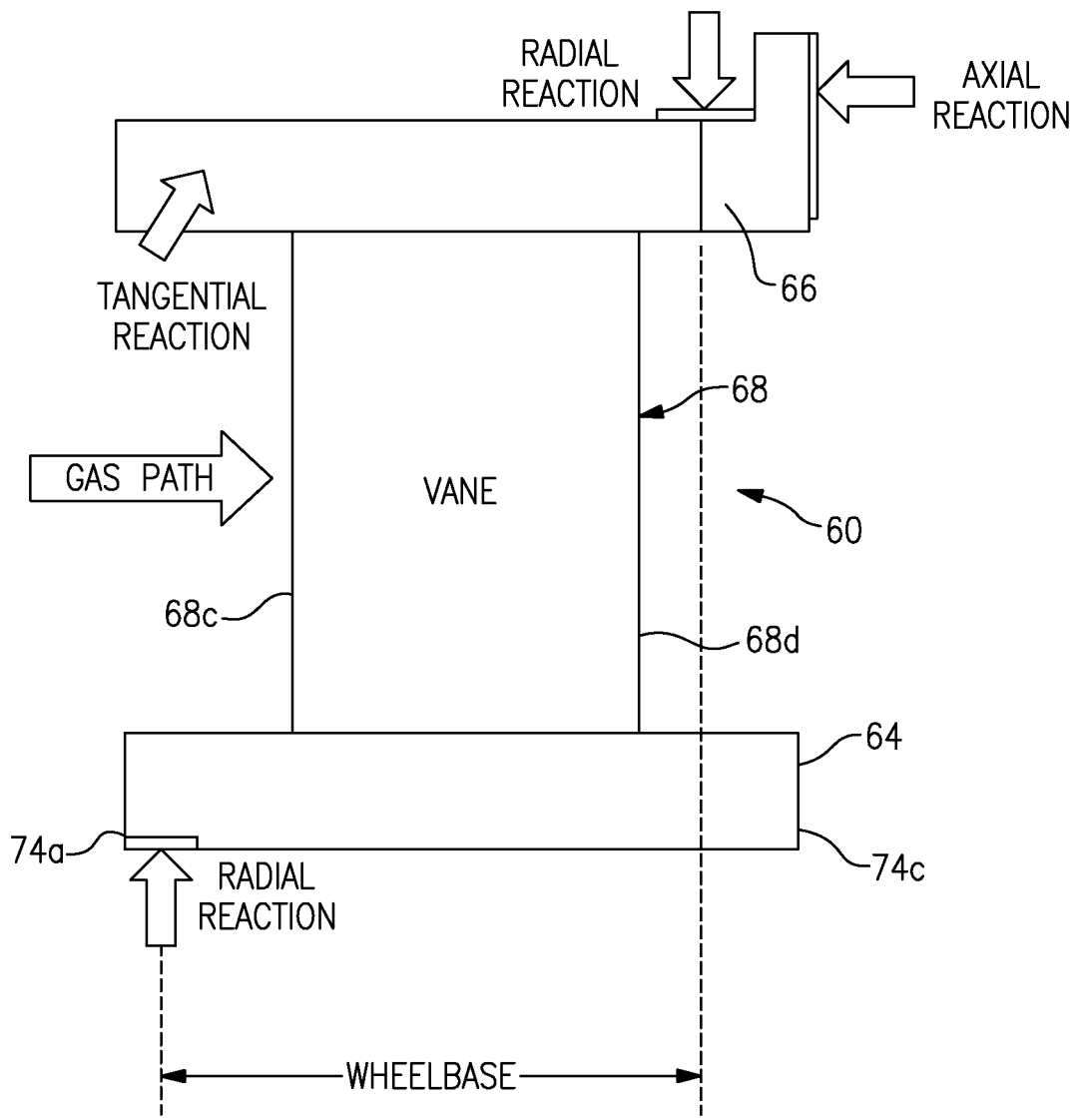
FIG. 4 illustrates a force diagram for a vane arc segment.

The combinations of features A), B), C), and D) above represent an alignment of the leading leg 70 with the ALV 78. Such alignment facilitates reducing the twist between the airfoil section 68 and the first platform 64 under the aerodynamic loads. Reducing twist facilitates lowering pressure stresses in the component. For instance, the cross-corner loads have a much more direct load path to be reacted. Furthermore, such alignment facilitates increasing the wheelbase of the vane arc segment 60, without modifying the overall axial length of the vane arc segment. The wheelbase is shown in a force diagram of a schematic representation of the vane arc segment 60 in FIG. 4. As shown, the radial reaction forces are reacted into the vane arc segment 60 near the pressure side leading corner 74a and are reacted out of the vane arc segment 60 at the second platform 66 (at the suction side trailing corner). The wheelbase is the linear distance between the radial lines at those locations. As can be appreciated from the diagram, if the corner 74a were instead designed without the aspects above such that the corner 74a was shifted to the right in the depiction, the resultant wheelbase would be shorter, thus generating a smaller lever arm for mitigating reaction loads. Additionally, the reduction in reaction loads may also facilitate more uniform stress distribution to the mating contact regions between the platforms 64/66 and supporting hardware, potentially reducing wear, bearing stress, and load reactions. It is to be understood that although the examples herein are based on the first platform 64 being a radially inner platform and the first side 68c being a pressure side, that the examples can also be applied to the radially outer platform 66. In that instance, given the same vane loading and aerodynamics, the first side chevron face would be on the suction side of the outer platform to obtain a similar longer wheelbase.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine component comprising:
a vane arc segment defining an axis, the vane arc segment including
an airfoil section having a first radial end, a second radial end, a first side, a second side, a leading edge, and a trailing edge, the airfoil section having associated characteristics including a center of pressure and an aerodynamic load vector through the center of pressure,
a first platform and a second platform arranged, respectively, at the first radial end and the second radial end of the airfoil section, the first platform defining a leading face, a trailing face, a first side chevron face, and a second side face, the first side chevron face having a leading leg and a trailing leg that meet at an angle, the leading leg being elongated along a centerline that is non-axially oriented with respect to the axis, the leading leg meeting the leading face at a leading first side corner, and the leading first side corner being located outside of the aerodynamic load vector relative to the leading edge of the airfoil section.

2. The gas turbine engine component as recited in claim 1, wherein the leading leg defines a plane that is non-intersecting with the aerodynamic load vector forward of the center of pressure.

3. The gas turbine engine component as recited in claim 1, wherein the centerline is substantially parallel with the aerodynamic load vector.

4. The gas turbine engine component as recited in claim 3, wherein the leading leg defines a plane that is non-intersecting with the aerodynamic load vector forward of the center of pressure.

5. The gas turbine engine component as recited in claim 1, wherein the airfoil section, the first platform, and the second platform form a continuous piece, and the continuous piece is formed of a ceramic matrix composite.

6. The gas turbine engine component as recited in claim 5, wherein the ceramic matrix composite includes silicon carbide fibers disposed in a silicon carbide matrix.

7. The gas turbine engine component as recited in claim 1, wherein the first platform is a radially inner platform, the first side chevron face is a pressure side chevron face, and the second side face is a suction side face.

8. A gas turbine engine component comprising:
a vane arc segment defining an axis, the vane arc segment including
an airfoil section having a first radial end, a second radial end, a pressure side, a suction side, a leading edge, and a trailing edge, the airfoil section having associated characteristics including a center of pressure and an aerodynamic load vector through the center of pressure,
a first platform and a second platform arranged, respectively, at the first radial end and the second radial end of the airfoil section, the first platform defining a leading face, a trailing face, a pressure side chevron face, and a suction side face, the pressure side chevron face having a leading leg and a trailing leg that meet at an angle, the leading leg defining a plane that is non-intersecting with the aerodynamic load vector forward of the center of pressure, the leading leg meeting the leading face at a leading pressure side corner, and the leading pressure side corner being located outside of the aerodynamic load vector relative to the leading edge of the airfoil section.

9. The gas turbine engine component as recited in claim 8, wherein the leading leg is elongated along a centerline, and the centerline is substantially parallel with the aerodynamic load vector.

10. The gas turbine engine component as recited in claim 8, wherein the airfoil section, the first platform, and the second platform form a continuous piece, and the continuous piece is formed of a ceramic matrix composite.

11. The gas turbine engine component as recited in claim 10, wherein the ceramic matrix composite includes silicon carbide fibers disposed in a silicon carbide matrix.

12. The gas turbine engine component as recited in claim 8, wherein the first platform is a radially inner platform.

13. A gas turbine engine component comprising:
a vane arc segment defining an axis, the vane arc segment including
an airfoil section having a first radial end, a second radial end, a pressure side, a suction side, a leading edge, and a trailing edge, the airfoil section having associated characteristics including a center of pressure and an aerodynamic load vector through the center of pressure,
a first platform and a second platform arranged, respectively, at the first radial end and the second radial end of the airfoil section, the first platform defining a leading face, a trailing face, a pressure side chevron face, and a suction side face, the pressure side chevron face having a leading leg and a trailing leg that meet at an angle, the leading leg being elongated along a centerline, and the centerline being substantially parallel with the aerodynamic load vector.

14. The gas turbine engine component as recited in claim 13, wherein the centerline is non-axially oriented with respect to the axis.

15. The gas turbine engine component as recited in claim 14, wherein the leading leg defines a plane that is non-intersecting with the aerodynamic load vector forward of the center of pressure.

16. The gas turbine engine component as recited in claim 13, wherein the leading leg meets the leading face at a leading pressure side corner, and the leading pressure side corner is located outside of the aerodynamic load vector relative to the leading edge of the airfoil section.

17. The gas turbine engine component as recited in claim 13, wherein the leading leg defines a plane that is non-intersecting with the aerodynamic load vector forward of the center of pressure.

18. The gas turbine engine component as recited in claim 13, wherein the airfoil section, the first platform, and the second platform form a continuous piece, and the continuous piece is formed of a ceramic matrix composite.

19. The gas turbine engine component as recited in claim 18, wherein the ceramic matrix composite includes silicon carbide fibers disposed in a silicon carbide matrix.

20. The gas turbine engine component as recited in claim 13, wherein the first platform is a radially inner platform.

* * * * *